United States Patent
Soundararajan et al.

(10) Patent No.: US 9,460,187 B2
(45) Date of Patent: *Oct. 4, 2016

(54) CREATION OF A GRAPH DATABASE OF A VIRTUALIZATION INFRASTRUCTURE

(71) Applicant: VMware, Inc., Palo Alto, CA (US)

(72) Inventors: Vijayaraghavan Soundararajan, Palo Alto, CA (US); Lawrence Spracklen, Boulder Creek, CA (US)

(73) Assignee: VMware, Inc., Palo Alto, CA (US)

( * ) Notice: Subject to any disclaimer, the term of this patent is extended or adjusted under 35 U.S.C. 154(b) by 319 days.

This patent is subject to a terminal disclaimer.

(21) Appl. No.: 13/912,358

(22) Filed: Jun. 7, 2013

(65) Prior Publication Data

US 2014/0365531 A1    Dec. 11, 2014

(51) Int. Cl.
G06F 17/30 (2006.01)

(52) U.S. Cl.
CPC ............... *G06F 17/30587* (2013.01)

(58) Field of Classification Search
CPC ............... G06F 17/30958; G06F 17/30292; G06F 17/30587
See application file for complete search history.

(56) References Cited

U.S. PATENT DOCUMENTS

| | | | |
|---|---|---|---|
| 8,700,611 B2 | 4/2014 | Kelshikar et al. | |
| 8,924,465 B1 * | 12/2014 | Tunguz-Zawislak | 709/203 |
| 8,924,865 B1 * | 12/2014 | Tiwari | G06F 9/4443 707/668 |
| 2006/0106847 A1 * | 5/2006 | Eckardt et al. | 707/101 |
| 2009/0094208 A1 * | 4/2009 | Marvit | G06F 17/30616 |
| 2011/0173184 A1 | 7/2011 | Kelshikar et al. | |
| 2012/0066118 A1 * | 3/2012 | Dantas | 705/39 |
| 2012/0299925 A1 | 11/2012 | Najork et al. | |
| 2013/0035995 A1 | 2/2013 | Patterson et al. | |
| 2013/0085877 A1 | 4/2013 | Rührig | |
| 2013/0346519 A1 * | 12/2013 | Soundararajan | G06Q 10/06 709/206 |
| 2014/0058754 A1 | 2/2014 | Wild | |
| 2014/0130160 A1 * | 5/2014 | Golovanov | 726/23 |
| 2014/0188862 A1 | 7/2014 | Campbell et al. | |
| 2014/0214945 A1 * | 7/2014 | Zhang | H04L 67/306 709/204 |
| 2014/0245163 A1 * | 8/2014 | Mubarek et al. | 715/738 |
| 2014/0344459 A1 | 11/2014 | Kludy et al. | |

* cited by examiner

*Primary Examiner* — Cam-Y Truong

(57) ABSTRACT

In a computer-implemented method for creating a graph database of a virtualization infrastructure, data defining entities and relationships of the entities of a virtualization infrastructure is received at a graph database, wherein the relationships of the entities are in accordance with an inventory structure of the virtualization infrastructure. The graph database is populated with the entities and the relationships of the entities of the virtualization infrastructure.

22 Claims, 10 Drawing Sheets

500 Continued

500 Continued

CREATION OF A GRAPH DATABASE OF A VIRTUALIZATION INFRASTRUCTURE

CROSS-REFERENCE TO RELATED APPLICATIONS

This application is related to co-pending U.S. patent application Ser. No. 13/912,389, also filed on Jun. 7, 2013, entitled "USING A GRAPH DATABASE OF A VIRTUALIZATION INFRASTRUCTURE" by Soundararajan, et al., and assigned to the assignee of the present application.

BACKGROUND

Administration of virtualization infrastructures, such as virtual datacenters, is increasingly complex. One of the biggest challenges in virtualized deployments is keeping track of the basic health of the infrastructure. Administrators would like to quickly be informed when problems occur and would also like to have guidance about how to solve issues when they arise. These problems are frequently exacerbated as the virtualized deployments increase in scale. Conventional means for monitoring these large environments typically focus on aggregating and summarizing the amount of data to manageable quantities. Reducing this data is typically challenging, in that both identifying serious issues in the virtualization and intelligent data visualization techniques are valuable.

Automated techniques for monitoring the health of virtualization infrastructure have become increasingly prevalent and helpful. Such approaches typically leverage the collection and analysis of a large number of metrics across an environment in order to provide a concise, simplified view of the status of the entire environment. However, despite the success of such tools, significant amounts of training is often still required in order to obtain to obtain proficiency at understanding and using the output of such tools.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DESCRIPTION OF EMBODIMENTS

Figure 1:
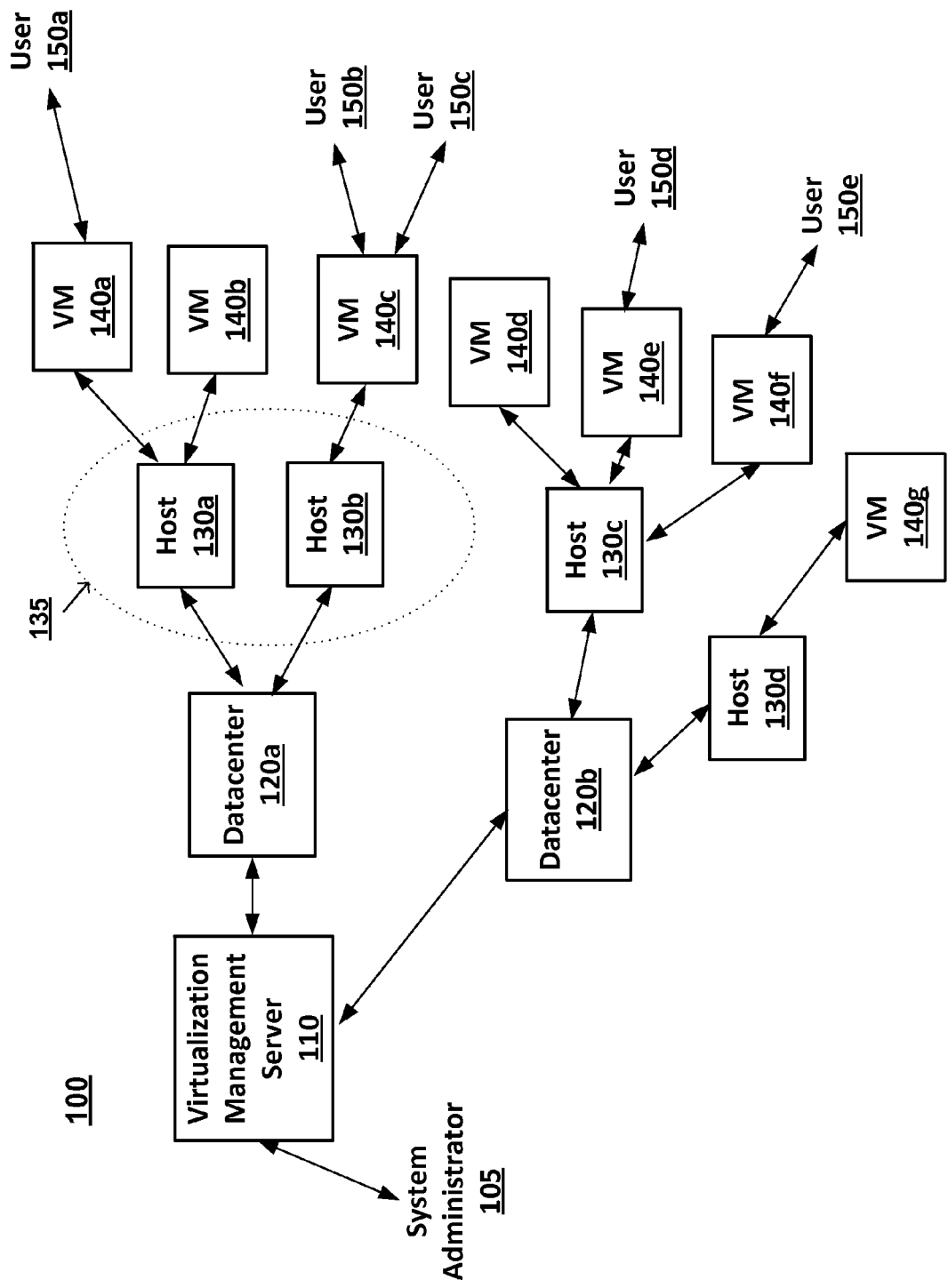
FIG. 1 illustrates an example network upon which embodiments of the present invention can be implemented.

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "receiving," "populating," "associating," "assigning," "updating," "determining," "creating," "retrieving," "detecting," "identifying," "generating," or the like, often refer to the actions and processes of an electronic computing device or system, such as a virtualization management server or a virtual machine (VM), among others, of a virtualization infrastructure. The electronic computing device/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Discussion

As previously described in the background, the administration of virtualization infrastructures is a complex endeavor. A typical virtualization administrator may be responsible for the management of hundreds of hosts and thousands of VMs. Typically, virtualization administrators are reliant on virtualization administration tools that provide a plethora of information. However, it is often difficult to distill this information into a manageable form due to the large scale of many virtualization deployments.

At least some embodiments of the present invention provide for the creation of a social network of members of a network of members. For instance, where the network is a virtualization infrastructure, the members of the virtualization infrastructure are mapped into a social network based on the parent/child relationships of the members. Affiliation relationships are established between parent members and child members of the virtualization infrastructure, allowing members to "follow" other members.

At least some embodiments of the present invention utilize social networking between members of the virtual infrastructure to provide aggregated and summarized management data to an administrator. In various embodiments described herein, a virtualized environment is mapped into a social network. For example, members of the social network may include, without limitation, human members, such as system administrators and VM users, and non-human members such as hosts, VMs, and administration servers.

At least some embodiments of the present invention describe coupling a virtualization management application programming interface (API), graph database, and social network in order to provide a portal for answering a wide variety of graph-oriented management questions in a virtualized environment. It should be appreciated that the described embodiments employ the use of social network descriptors to define simplified relationships between entities (e.g., follower/followee relationships and group membership). Embodiments use a virtualization management API to define the entities (e.g., VMs and hosts) and relationships (e.g., datastore or network connectivity), and populate a social network with such data. The resulting graph of the social network is imported into a graph database. Query languages and interfaces are used to access these graphs and answer common management questions.

Various embodiments described herein capitalize on the sort of data that is stored, namely, connectivity data in the form of a large, distributed graph database. In the described embodiments, the type of data stored (connectivity data) is well-matched to the mechanism of storage (a graph database). A relational database in a virtualized infrastructure can be considered as containing graph information. For example, the relationships between various entities like hosts, VMs, and datacenters include graph information. Questions of interest to a virtualization administrator can be answered easily when couched in terms of a graph database. For example, suppose a virtualization administrator would like to know how many VMs have disks that span multiple storage arrays, or which datastore is most critical (because it has the most VMs and hosts on it). These questions can be expressed in terms of graph traversal.

Discussion begins with a description of a comparison of virtualization infrastructures to social networks. Creation of a social network based on the members of the network is then described. Creation of a graph database based on a social network of a virtualization infrastructure is then described. Using a graph database for of a virtualization infrastructure is then described. Operation of various processes involved in the creation of the social network and the management of the members of the social network are then described, including examples of creating a social network for members of a virtualization infrastructure, creating a graph database based on a social network of a virtualization infrastructure, and using a graph database for of a virtualization infrastructure.

Comparison of Virtualization Infrastructures to Social Networks

FIG. 1 illustrates a virtualization infrastructure 100 upon which embodiments of the present invention can be implemented. Virtualization infrastructure 100 may be used, for example, to provide hardware virtualization enterprise services. Virtualization infrastructure 100 includes various network nodes working in tandem to provide virtualization. As illustrated, virtualization infrastructure 100 includes virtualization management server 110, datacenters 120a and 120b, hosts 130a-d, and VMs 140a-g. It should be appreciated that virtualization infrastructure 100 may include any number of virtualization management servers, datacenters, hosts, and VMs, and that the number of components shown in FIG. 1 is for illustrative purposes only.

It should be appreciated that virtualization infrastructure 100 includes physical members and logical groups. As FIG. 1 illustrates, virtualization management server 110 includes datacenter 120a, which in turn includes hosts 130a and 130b. Hosts 130a and 130b also are members of cluster 135. Cluster 135 includes VMs 140a-c. In one embodiment, the hierarchy of virtualization infrastructure 100 can be mapped to a social network. In other embodiments, system administrator 105 and users 150a-e are humans that interact with virtualization management server 110.

For example, members of virtualization infrastructure 100 can establish affiliation relationships with other members. For purposes of the instant application, an affiliation relationship refers to a connection between two members of virtualization infrastructure 100 in which each of the members of the affiliation relationship have the ability to receive and monitor each other's status. For example, in Socialcast®, the affiliation relationship is referred to as "following." In other social network applications, the affiliation relationship may refer to "friends" or "connections." It should be appreciated that while different terms may be used to describe an affiliation relationship, an affiliation relationship generally affords its members privileges regarding the access of and commenting on the status of its members, and that these terms can be used interchangeably.

Continuing with the example, a system administrator 105 can "follow" virtualization management server 110. In turn, virtualization management server 110 can follow hosts 130a and 130b. Host 130a can follow VMs 140a and 140b, and host 130b can follow VM 140c. It should be appreciated that the hierarchy provides a manner for limiting information flow.

Figure 2:
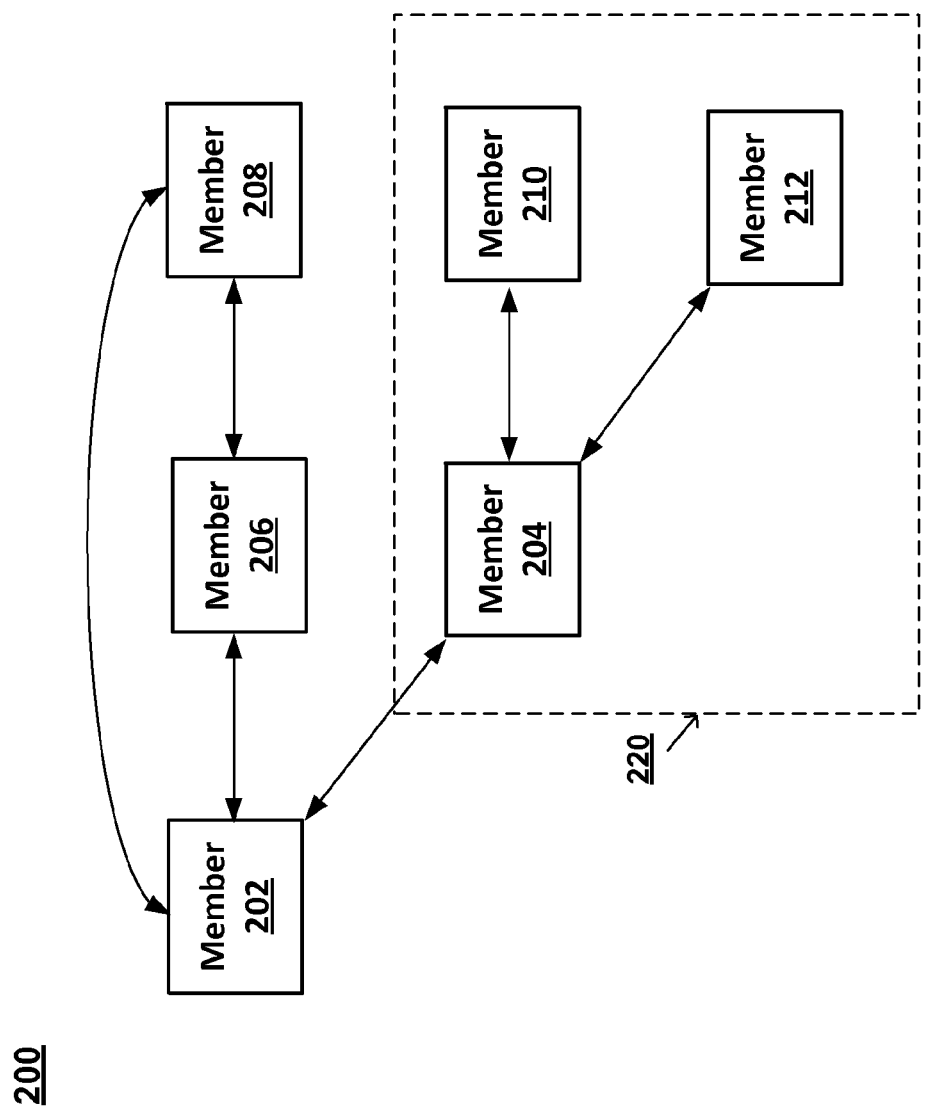
FIG. 2 illustrates an example social network, according to various embodiments of the present invention.

FIG. 2 illustrates an example social network 200, according to various embodiments of the present invention. For purposes of the description of FIG. 2, a two-way arrow suggests an affiliation relationship (e.g., a friend relationship or a following relationship). For example, member 202 is friends with member 204 and member 204 is friends with member 212, but member 212 is not friends with member 202. In addition, member 204, 210 and 212 might choose to create a separate, private group 220. It should be appreciated that there is a distinction between physical entities, namely the members of social network 200, and the logical entities, such as group 220. It should be appreciated that the actions of various non-human members of the social network, e.g., "choosing" and similar operations, are defined programmatically and executed by the member.

In a social network, member 202 may choose instead to only be friends with member 204, knowing that if anything interesting happens to members 210 and 212, that member 204 will likely collect such information and share it with member 202. In a similar manner, with reference to FIG. 1, virtualization management server 110 need not choose to be friends with all VMs 140a-g, but just with hosts 130a-d. If a host receives enough status updates from the VMs running on it, it may choose to signal a status change to virtualization management server 110. In a similar way, system administrator 105 may choose to be friends only with virtualization management server 110, knowing that virtualization management server 110 can accumulate status updates and propagate them to system administrator 105.

It should be appreciated that datacenters, clusters, and resource pools are not included as having affiliation relationships in a social network of a virtualization infrastructure, because they do not have a physical manifestation. In other words, while system administrator 105 can send and receive network packets to/from VMs and hosts, system administrator 105 cannot send a message to a datacenter. Instead, a datacenter, cluster, resource pool, and host/VM folders are more similar to a group in a social network. However, it should be appreciated that a datacenter, as well as clusters, might be associated with other components, such as processors and controllers that might be able to send or receive messages. It should also be appreciated that datacenters and clusters may have a physical manifestation. It should also be appreciated that the notion of a group can also refer to user-defined collections of member. For example, it may be helpful to put all VMs that run a particular application in a given group, or it might be helpful to put all VMs under a given resource pool in a given group.

Creation of a Social Network

Figure 3:
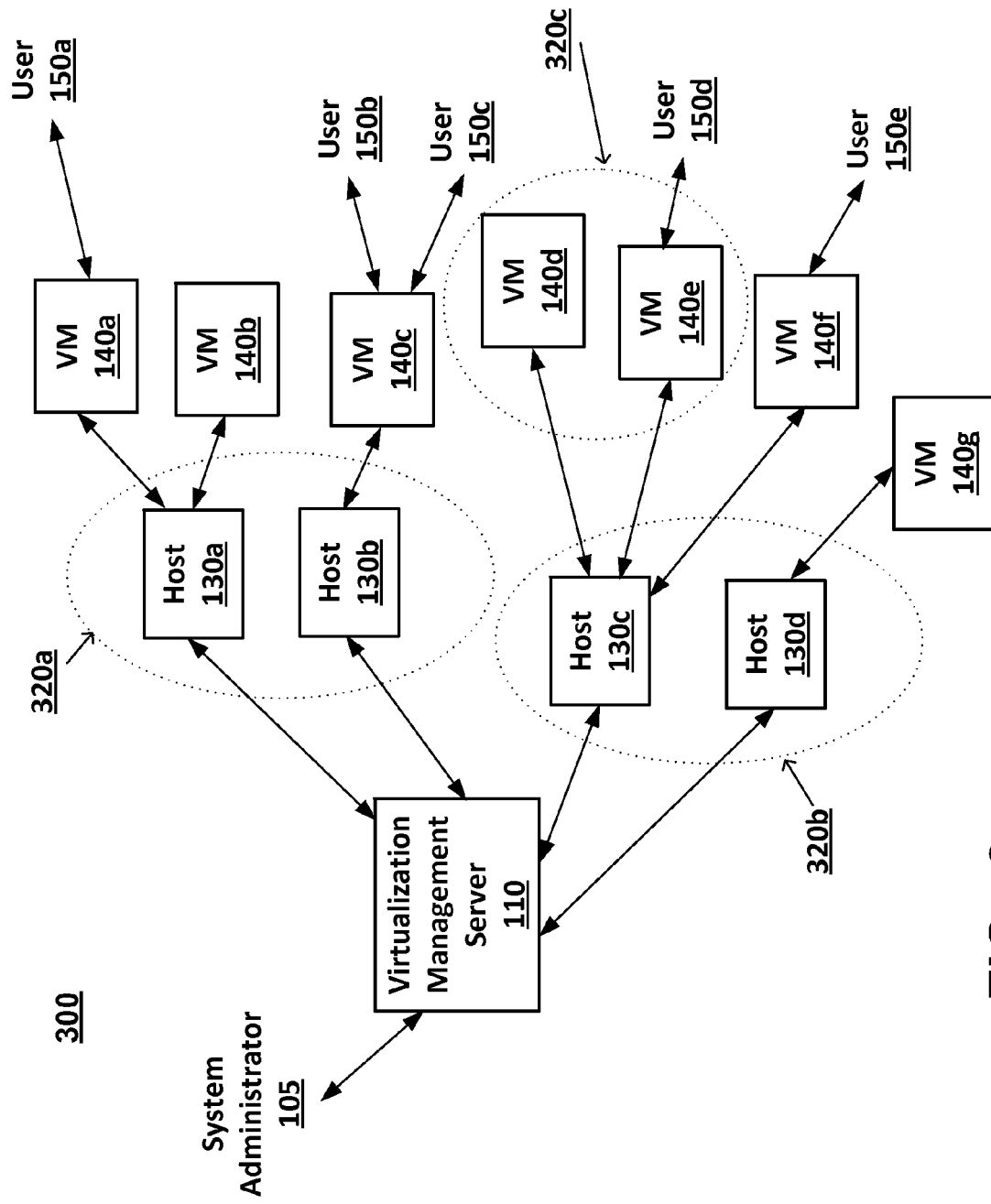
FIG. 3 illustrates an example social network based on a virtualization infrastructure, according to various embodiments of the present invention.

At least some embodiments of the present invention provide for creating a social network of members of a virtualization infrastructure. FIG. 3 illustrates an example social network 300 based on a virtualization infrastructure, according to various embodiments of the present invention. Social network 300 is populated with members of virtualization infrastructure 100.

At least a portion of the members of the virtualization infrastructure are identified at a virtualization infrastructure manager. In one embodiment, virtualization management server 110 is able to start at any node (e.g., member) of virtualization infrastructure 100 and locate all children of that node. In one embodiment, the virtualization management server 110 allows for the specification of the type of children to be located. For example, virtualization management server 110 may be directed to select all VMs within a datacenter (e.g., VMs 140a-c of datacenter 120a). It should be appreciated that these children do not have to be the immediate children with a datacenter. For example, with reference to FIG. 1, given the identification of the datacenter (e.g., datacenter 120a) and the identification of the type as "Virtual Machine," VMs 140a-c would be identified. In one embodiment, the parent-child relationships are in accordance with the VMware Virtual Infrastructure Management (VIM) API, also referred to as the vSphere API.

As presented above, note that some children are not active participants in a social network. For example, a cluster is typically a logical construct, not a physical one, since a cluster itself might not be able to send/receive a message. In contrast, a host or VM can send/receive messages. In one embodiment, a member is pinged to determine whether it is an active participant in the social network. For purposes of the instant application, active participants refer to members that can send/receive messages and passive participants refer to members that are not able to send/receive messages themselves.

Upon identifying the parent/child relationships of the members of virtualization infrastructure 100, social network 300 is generated having the hierarchy of virtualization infrastructure 100. Affiliation relationships between the parent and child members of virtualization infrastructure 100 are established (e.g., follower/followee relationships or friend relationships). For example, host 130c follows its VMs 140d-f, and users 150d and 150e follow VMs 140e and 140f, respectively. In addition, virtualization management server 110 follows hosts 130a-d. Moreover, hosts 130a-d can join groups corresponding to their datacenters, such that hosts 130a and 130b are in group 320a corresponding to datacenter 120a. Similarly, hosts 130a-d can join groups without corresponding datacenters, e.g., hosts 130c and 130d are in group 320b. It should be appreciated that many different types of groups may be used in accordance with the described embodiment. For example, clusters can include hosts (or VMs), resource pools can include VMs. In another example, a parent member can be a group, e.g., host X following VMs Y, N, and Z, and can have a separate group called "Host X" in which VMs Y, N, and Z are members. Furthermore, special groups are also available, e.g., VMs running particular applications are grouped together. For example, group 320c might represent VMs 140d and 140e running a particular application.

In various embodiments, the social network affiliation relationships are updated in response to a member being removed from or being added to virtualization infrastructure 100. In one embodiment, the social network affiliation relationships are updated in response to a member moving with virtualization infrastructure 100, e.g., a vMotion® has occurred. For example, when a VM moves from one host to another host, virtualization management server 110 detects the movement. Responsive to the VM moving, the affiliation relationships are updated such that the source host "unfollows" the VM and the destination host "follows" the VM.

In one embodiment, an agent is installed as a service/daemon that starts running as soon as the operating system (OS) of a member starts. At initialization the agent retrieves a unique identifier that can be used to uniquely identify the OS to Socialcast®. For instance, the unique identifier can be the Media Access Control (MAC) address. The Socialcast® server is queried (e.g., using the MAC address as its Socialcast® username) to determine necessary configuration information, including internal Socialcast® identifiers and groups and streams to which the agent should monitor/post. It should be appreciated that alternatives to the MAC address can be used. For example, the universally unique identifier (UUID) for a VM can be used, as the UUID uniquely identifies the VM among all other VMs. In one embodiment, it is determined if there are special virtualization applications running for which additional monitoring can be performed. In the present embodiment, the Socialcast® profile photo is updated based on the operating system and applications that are running, as well as the entity type. For example, a host would have a different profile photo (e.g., icon) from a VM.

In one embodiment, the Internet Protocol (IP) address of the Socialcast® server is hardcoded in the VMs. However, it should be appreciated that the IP address of the Socialcast® server can be included in a VM when the VM is deployed. Moreover, in one embodiment, users are created in Socialcast® using the MAC address of the associated members as the username and email. For example, a VM wakes up and logs into Socialcast® using its MAC address. The Socialcast® server sends a private message to the VM that contains the VM's Socialcast® identifier (ID). Once the VM receives its Socialcast® ID, the Socialcast® ID can be used in all future correspondence (e.g., posting public messages, sending messages to groups, etc.) using Socialcast®. As described herein, in one embodiment, the initial login to the Socialcast® server only requires a member's MAC address and a password, rather than the Socialcast® ID. The Socialcast® server can send the Socialcast® ID over the private message channel to provide a member with its Socialcast® ID.

Creation of a Graph Database Based on a Social Network of a Virtualization Infrastructure At least some embodiments of the present invention facilitate administration of a network of members. While the embodiments described herein are directed toward creating and using a graph database based on a social network of a virtualization infrastructure, it should be appreciated by one of skill in the art that the described embodiments are not limited as such. In particular, embodiments of the present invention may be used to facilitate the management of any network of members using a graph database of a virtualization infrastructure populated without using a social network.

As described herein, various embodiments of the present invention combine management of a virtualization infrastructure with a social network platform, providing intuitive virtualization infrastructure management. The virtualization infrastructure is organized into a social network, including both human members, such as system administrators and user, and non-human members, such as virtualization management servers, hosts and VMs.

A virtualization infrastructure has a wide variety of information of interest to the virtualization administrator. For example, in one embodiment, this data is typically organized using a combination of a relational database (e.g., the virtualization management database) and an XML database (e.g., an embedded inventory service). However, many questions of interest to an administrator can be couched in terms of the connectivity graph for the virtual inventory. For example, an administrator may wish to know the answer to the question "Is there an administrator with both access to datastore X as well as VM Y?" While this question can be answered via well-structured API calls to the virtualization manager, these queries require precise design and significant amounts of training. However, the graph database as described herein can answer the question much more easily and can be expressed more intuitively. Moreover, it can be extended to answer a large number of other queries as well.

Embodiments described herein reorganize inventory data into a graph database, combining the inventory data with relationships from a social network, and using this connectivity structure to address many particular concerns of a virtualization administrator.

Figure 4:
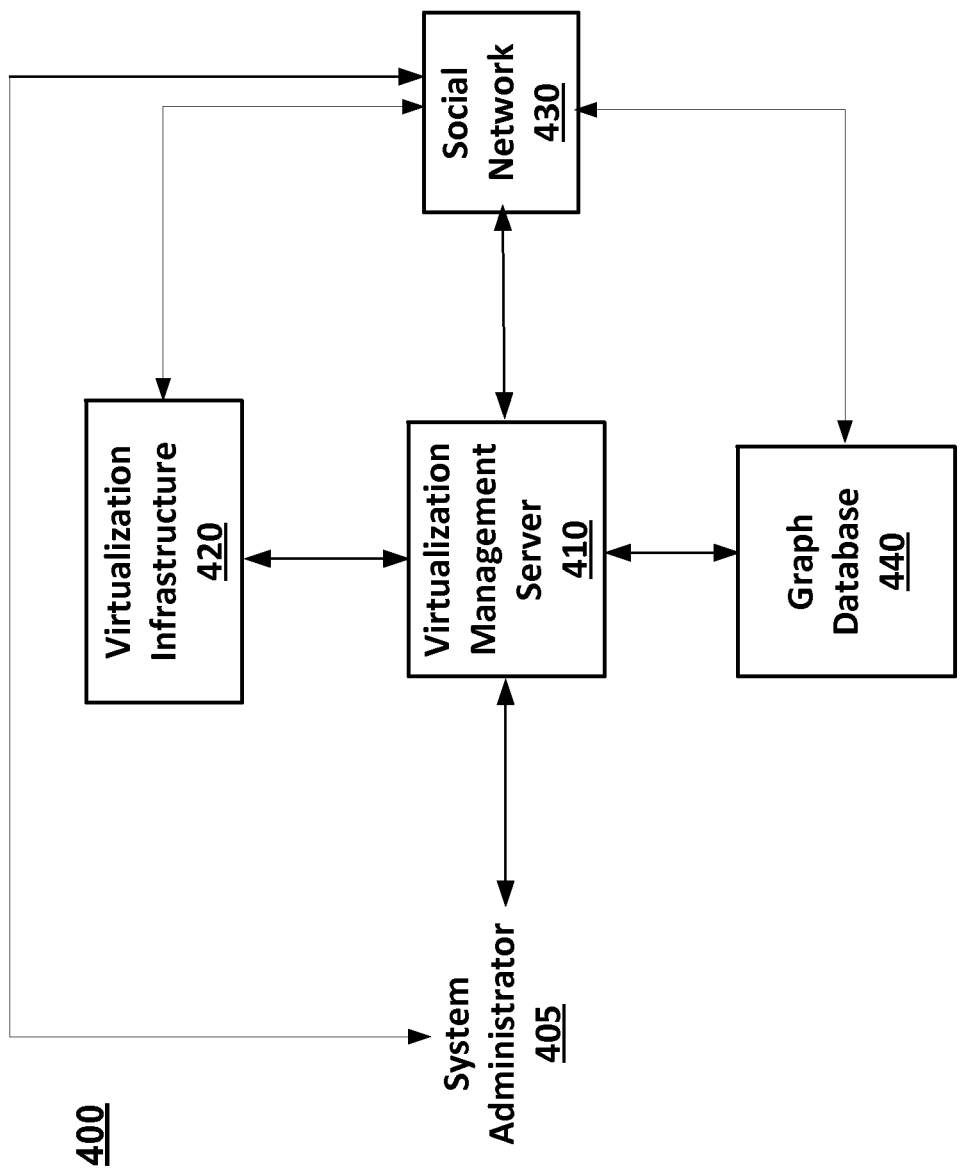
FIG. 4 illustrates a system for creating and using a graph database, according to various embodiments of the present invention.

FIG. 4 illustrates a system 400 for creating and using a graph database 440, according to various embodiments of the present invention. As illustrated, system 400 includes virtualization management server 410, virtualization infrastructure 420, social network 430, and graph database 440. In one embodiment, system administrator 405 is a human that interacts with virtualization management server 410. It should be appreciated that system 400 may include any number of virtualization management servers, virtualization infrastructures, social networks, and graph databases, and that the number of components shown in FIG. 4 is for illustrative purposes only.

Virtualization management server 410 is configured to record the inventory structure of the virtualization infrastructure 420. In one embodiment, virtualization management server 410 uses an API (e.g., VMware's VIM API) to record the inventory structure of the virtualization infrastructure 420. For example, a datacenter is traversed and hosts and VMs are recorded, as well as their datastores and networks. This function is described above in accordance with the operations of virtualization management server 110 of FIGS. 1 and 3.

In one embodiment, virtualization management server 410 interfaces with social network 430 (e.g., Socialcast) to create a social network of virtualization infrastructure 420. In accordance with various embodiments, for certain entities (e.g., hosts or VMs), a user in social network 430 is created. This data is published to social network 430 to create follower relationships. For other entities (e.g., datastores or networks), a group is created in social network 430, and users are added to those groups. This function is described above in accordance with the operations of virtualization management server 110 of FIGS. 1 and 3.

It should be appreciated that social network 430 is not required for the creation of the graph database. In particular, it is the member information and the relationship information between members that is used to populate graph database 440. For example, social network 430 provides information of the member and follower/followee relationships between the members. If social network 430 is not used, the member and follower/followee relationships can be determined according in the same manner described above in accordance with the creation of a social network. In other words, while social network 430 is a potential source of the member and relationship information, the member and relationship information can be generated and used to populate graph database 440 if there is no social network 430.

Virtualization management server 410 provides graph database 440 with the member and relationship information of social network 430. Various embodiments of the present invention can be implemented using Neo4j, an open-source graph database that is architected to be both fast and scalable, and provides a powerful, human-readable graph query language (referred to as Cypher) that allows users to efficiently extract key insights from their data. Neo4j stores data in nodes connected by directed, typed relationships and provides the ability to associate properties with both. It should be appreciated that while embodiments are described herein using Neo4j, other graph databases with similar functionality may also be used.

In one embodiment, graph database 440 retrieves data from social network 430. Graph database 440 converts social network 430 users and groups into nodes in a graph, and assigns types to the nodes as well as types to the relationships. For example, a network is a group in social network 430, but a node in graph database 440. A VM is a member of a network group in social network 430, but is connected to a network via a "member" relationship in graph database 440.

In one embodiment, graph database 440 represents the elements in the datacenter (e.g., vCenter, hosts and VMs) as nodes and the edges between these nodes track their relationship to one another. For example, a host follows a VM, so a "follow" relationship is established between these two nodes. Similarly, a datastore comprises multiple VMs, so a datastore is represented as a node, and the VMs that comprise the datastore are related to datastore node with a "member" relationship. In various embodiments, types are assigned to relationships (e.g., hosts follow VMs, and VMs are members of networks) primarily for convenience and to make queries more easily understandable. In another embodiment, an additional node type called "user" is used for connecting users to their VMs.

At least some embodiments of the present invention provide a graph database 440 for storing the connectivity data, where the API of graph database 440 can be used for determining relationships. For example, a user (e.g., system administrator 405) can retrieve the followers of the followers of a given node with a single round trip to the graph database using a short query. From a performance perspective, a general-purpose relational database, such as MySQL, is not specially tuned for graph traversals, requiring index lookups followed by data lookups, while graph databases store edge information directly with each entity, which might make it faster to determine relationships.

Embodiments described herein provide graph database 440 as a secondary storage medium, supplementing a relational database, in order to solve specific types of problems. It should be appreciated that a graph database might require less overall storage space for its data than an equivalent inventory in a relational database as only a subset of the data is stored.

Using a Graph Database of a Virtualization Infrastructure

With reference to FIG. 4, graph queries are received at graph database 440. In one embodiment, the graph query is received at virtualization management server 410 and communicated directly to graph database 440. In another embodiment, the graph query is received at virtualization management server 410 and communicated to graph database 440 via social network 430. In another embodiment, the graph query is received at social network 430 and communicated directly to graph database 440. In another embodiment, the graph query is received at graph database 440. For example, graph queries sent through Socialcast® (e.g., by typing a message to the Neo4j server) use the Neo4j backend to compute the result set, with results returned as a message to system administrator 405.

At least some embodiments of the present invention provide the use of a graph database of a virtualization infrastructure. It should be appreciated that while the described embodiments utilize the graph database based on the social network follower/followee relationships described above, any graph database of a virtualization infrastructure may be used and queried. In other words, the graph database of the virtualization infrastructure might be created without the use of a social network.

Neo4j supports a structure query language (SQL)-like language called Cypher for querying the graph database. An end user can issue queries to Neo4j interactively through a web interface or programmatically using various language bindings. In one embodiment, the Python py2neo module is utilized for accessing the Neo4j graph database.

For example, an end user can write sample queries directly to the Neo4j graph database. In another example, the end user can access the Neo4j graph database via Socialcast® by creating a special Neo4j user. An end user sends a private message containing Cypher queries to the Neo4j user. A Neo4j server listens for private messages to the Neo4j user and then dispatches these queries to the Neo4j graph database. The results are returned in a private message to the requester.

In accordance with various embodiments, in addition to allowing the user to send Cypher queries to the Neo4j graph database, shorthand versions of command queries are also provided. For example, a user can enter "find VMs in vCenter A" to find all VMs associated with vCenter A. This can be faster than using the standard Socialcast® user interface, in which a user would need to first browse to the vCenter user, then browse to each of its "host" followers to find all VMs associated with that vCenter.

The following examples illustrate use cases for the graph database of the virtualization infrastructure described herein. First, the reorganizing of data into a graph database for providing assistance in risk analysis in a virtualization infrastructure is described. Second, examples of situations where a graph database can be used to solve typical day-to-day issues in the management of a virtualization infrastructure are described I. Risk Analysis Examples A. Is there a Single Point of Failure?

Suppose the datacenter has a policy that each host has multiple network interface cards (NICs), and that each NIC should connect to a different network. Therefore, each host should be connected to multiple networks. Example code for this query is:

```
#1 start a=node(*)
#2 match a-[:member]-c
#3 where a.type = "host" and c.type = "Network"
#4 with a, count(c) as fcount
#5 where fcount = 1
#6 return a
```

In this example query, lines #1 and #2 indicate that we should examine every node "a" which is a member of some group "c". Line #3 adds the constraint that the node "a" is a host and the node "c" is a network. Lines #4 and #5 add the constraint that the number of networks that the host is connected to is 1. In other words, if the number of hosts is one, then there is a single point of failure, violating the constraint that each host should be connected to multiple networks. Line #6 returns all such hosts.

It should be appreciated that this query could have been generalized in a number of ways. The group type could be changed to be "c.type=datastore", and all hosts would be connected to just a single datastore. No semantic understanding of the topology is required: the fact that networks and datastores are different types changes the query only slightly.

B. Is there a Single Entity (Host or VM) with an Unusually Large Number of Dependencies?

This query is useful in case an administrator wishes to find some weak spots in the infrastructure. In this case, the number of dependencies is essentially equivalent to the number of relationships. The query is structured to find the number of relationships per entity and return a sorted list. The example code is:

```
#1 start a=node(*)
#2 match a-->(x)
#3 where a.type = "host" or a.type = "VM"
#4 with a, count(*) as fcount
#5 return a, fcount
#6 order by fcount
#7 limit 5
```

In this query, lines #1 and #2 indicate that every node "a" which has any sort of relationship with any other node is examined (e.g., follower or member of a group). In line #3, "a" is constrained to be either a VM or a host. In line #4, the count of such relationships is retained, and in lines #5, #6, and #7, the top 5 such hosts or VMs are returned.

C. Are there any datastores with a disproportionately large number of Virtual Machine Disks (VMDKs)?

This example considers datastores with >500 VMDKs to see if any datastore is unusually highly loaded relative to others. The example code for the query is as follows:

```
#1 start a=node(*)
#2 match a-[:member]-b
```

```
#3 where b.type = "VMDK" and a.type = "Datastore"
#4 with a, count(b) as fcount
#5 where fcount > 500
#6 return a, fcount
#7 order by fcount
```

In this query, lines #1 and #2 indicate that every node "a" is examined where "a" is a member of "b" or "b" is a member of "a" ("-" indicates a bidirectional relationship). In line 3, "a" is constrained to be a datastore and "b" is constrained to be a VMDK, since VMDKs are members of datastore groups. Finally, lines #4 through #7 return a sorted list of datastores and how many VMDKs meet the prior constraints. Alternatively, the query could have asked if there are any datastores with a disproportionately large number of VMs. The query is similar.

II. Day-to-day Operations Examples

A. Assessing Impact of Downtime

Suppose an administrator wants to move VMs from one network to another. The administrator would like to know which users would be affected by this. This query is based on the "user" type in the graph database. The example query is:

```
#1 start a=node:names(uuid="X")
#2 match a-[:member]-c-[:following]-d
#3 where c.type = "VM" and d.type = "User"
#4 return d.name
```

In line #1, the node whose universally unique identifier (UUID) is "X", where X is the network that we care about. In line #2, all nodes "c" that are a member of this network "a" and also have a follower "d" are found. In line #3, it is further specified that c is a VM and d is a user. Line #4 returns the names of such users.

B. Disaster Recovery Planning

Another example is disaster recovery planning. It would be helpful to quickly assess how many VMs would be affected if a certain datastore/network combination went down. The example query using Neo4j is:

```
#1 start
#2 a=node:names(uuid'"X"),b=node:names(uuid="Y")
#3 match a-[:member]-c
#4 where b-[:member]-c and c.type = "VM"
#5 return c
```

Line #1 starts the query. In line #2, nodes "a" and "b" whose UUIDs are X and Y are started with, representing the network and datastore of concern. In line #3, all nodes "c" with a "member" relationship to "a" are found. These could be hosts or VMs. In line #4, these nodes "c" are pruned by determining if they have a member relationship with "b" and are of type "VM". These are the VMs that are members of network X and datastore Y.

The prior example assumes that a VM is a direct member of a datastore group. However, consider making VMs follow VMDKs, and making VMDKs the only members of datastore groups. In that case, the same information as in the previous example query can be found using the following example code:

```
#1 start
#2 a=node:names(uuid="X"), b=node:names(uuid="Y")
#3 match
#4 a-[:membed-c, c-[:following]-d-[:member]-b
#5 where c.type = "VM" and d.type = "VMDK"
#6 return distinct(c)
```

Here, nodes "c" that are following node "d" are found, where node "c" is a VM, node "d" is a VMDK, and node "d" has a member relationship with datastore "b". Because a VM may have multiple VMDKs, a distinct is used in line #6.

C. Enforcing Policies: Linked Clones

A final example involves linked clones. A linked clone is made from a snapshot of a parent where all files available on the parent at the moment of the snapshot continue to remain available to the linked clone. Changes made by a linked clone are stored in a change file, and do not change the base disk shared by the linked clones. A user for each VMDK is created in an infrastructure, and VMs that use a given VMDK are created as followers of VMDK. Suppose for performance reasons an IT administrator would like to enforce a policy in which a base disk should be shared by no more than eight linked clones. This example query is expressed as follows:

```
#1 start
#2 a=node(*)
#3 match a-[:following]-c
#4 where a.type = "VM" and c.type = "VMDK"
#5 with c, count(a) as fcount
#6 where fcount > 8
#7 return c, fcount
#8 order by fcount
```

Example Methods of Operation

The following discussion sets forth in detail the operation of some example methods of operation of embodiments. With reference to FIGS. 5A-C, 6A, 6B, 6C, and 7, flow diagrams 500, 600, 640 and 700 illustrate example procedures used by various embodiments. Flow diagrams 500, 600, 640 and 700 include some procedures that, in various embodiments, are carried out by a processor under the control of computer-readable and computer-executable instructions. In this fashion, procedures described herein and in conjunction with these flow diagrams, alone or in combination, are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, solid-state disks, any or all of which may be employed within virtualization infrastructure 100 or system 400. The computer-readable and computer-executable instructions, which reside on tangible computer readable storage media, are used to control or operate in conjunction with, for example, one or some combination of processors of virtualization infrastructure 100 or system 400. It is appreciated that the processor(s) may be physical or virtual or some combination (it should also be appreciated that a virtual processor is implemented on physical hardware). Although specific procedures are disclosed in flow diagrams 500, 600, 640 and 700, such procedures are examples. That is, embodiments are well suited to performing various other procedures or variations of the procedures recited in flow diagram 500, 600, 640 and 700, alone or in combination. Likewise, in some embodiments, the procedures in flow diagrams 500, 600, 640 and 700, alone or in combination, may be performed in an order different than presented and/or not all of the procedures described in one or more of these flow diagrams may be performed. It is further appreciated that procedures described in flow diagram 500, 600, 640 and 700, alone or in combination, may be implemented in hardware, or a combination of hardware with firmware and/or software.

Figure 5A:
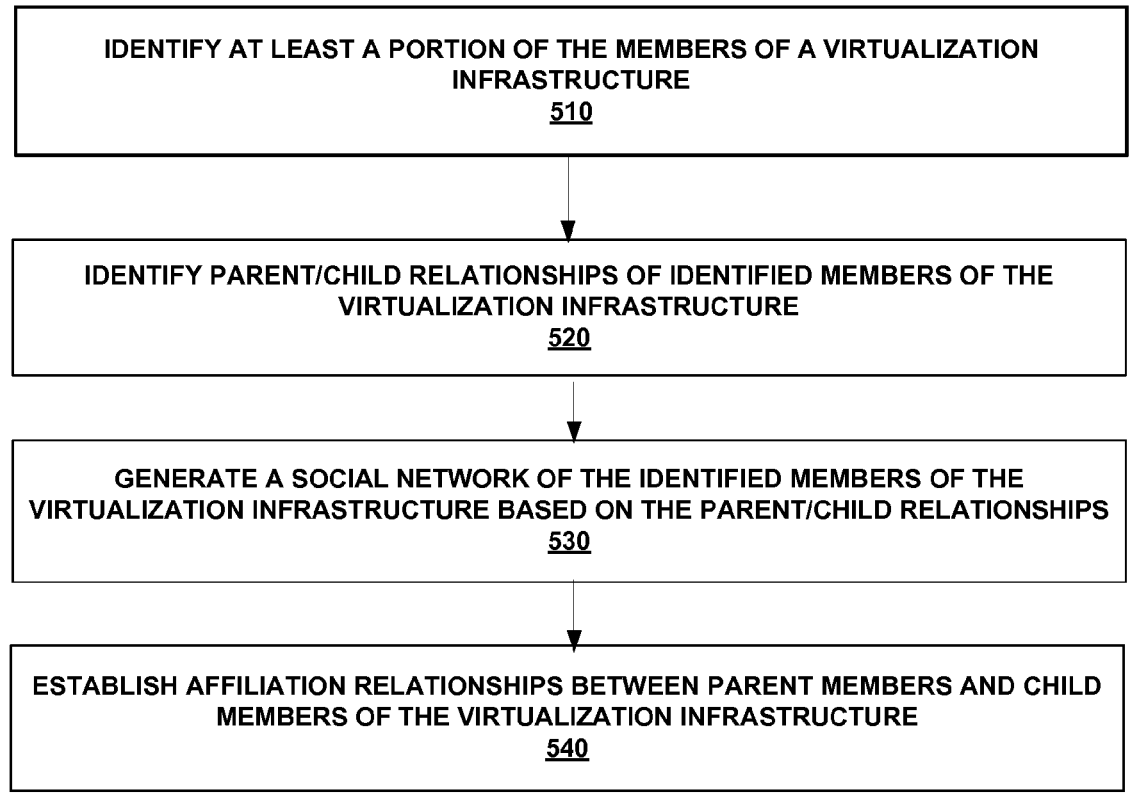
FIGS. 5A-5C are flow diagrams of example operations of a method for creating a social network of members of a virtualization infrastructure, according to various embodiments of the present invention.
Figure 5B:
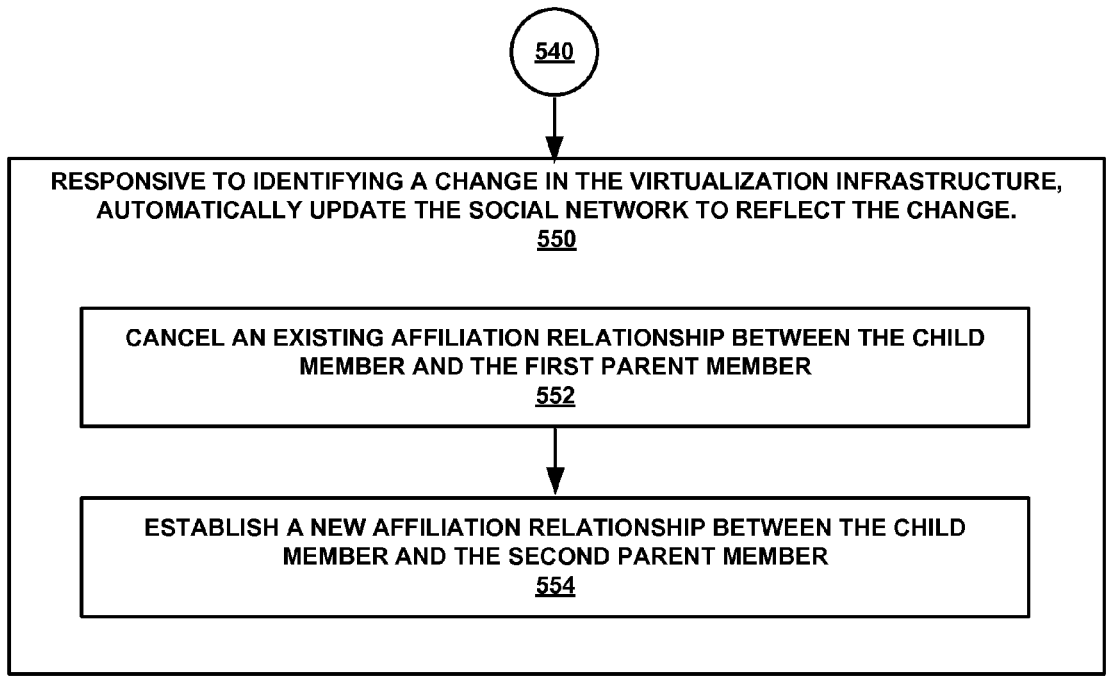
Figure 5C:
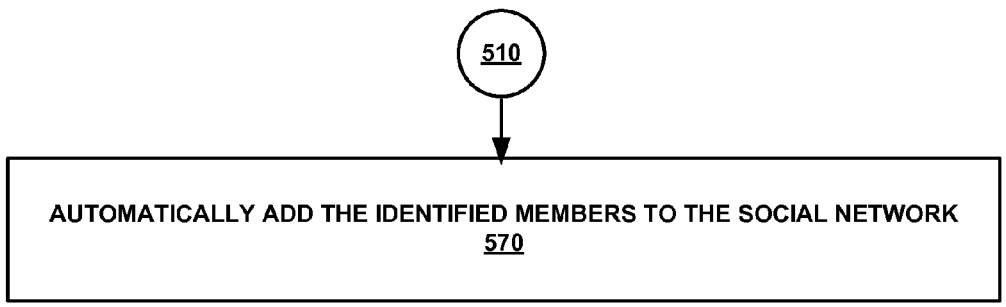

FIGS. 5A-C are flow diagram 500 of a method for creating a social network of members of a virtualization infrastructure, according to various embodiments of the present invention. Although specific procedures are disclosed in flow diagram 500, embodiments are well suited to performing various other procedures or variations of the procedures recited in flow diagram 500. It is appreciated that the procedures in flow diagram 500 may be performed in an order different than presented, that not all of the procedures in flow diagram 500 may be performed, and that additional procedures to those illustrated and described may be performed. All of, or a portion of, the procedures described by flow diagram 500 can be implemented by a processor or computer system executing instructions which reside, for example, on computer-usable/readable media.

At procedure 510 of flow diagram 500, at least a portion of the members of the virtualization infrastructure are identified at a virtualization infrastructure manager. For example, with reference to FIG. 1, in one embodiment, virtualization management server 110 starts at any node (e.g., member) of virtualization infrastructure 100 and locates all children of that node. In one embodiment, the active members of the virtualization infrastructure are identified. For purposes of the instant specification, this operation is also referred to as mapping the virtualization infrastructure.

In one embodiment, the members of the virtualization infrastructure include a system administrator, a virtualization management server, a plurality of hosts, and a plurality of virtual machines. The members are arranged in a hierarchy such that the system administrator has an affiliation relationship with the virtualization management server, and the virtualization management server has an affiliation relationship with at least one host of the plurality of hosts. In one embodiment, the virtualization infrastructure also includes a datacenter, wherein the datacenter represents a group of hosts of the plurality of hosts.

At procedure 520, parent/child relationships of the identified members of the virtualization infrastructure are identified. In one embodiment, the parent/child relationships are determined as virtualization management server 110 locates the children of the nodes.

At procedure 530, a social network of the identified members of the virtualization infrastructure based on the parent/child relationships is generated. In one embodiment, the social network is generated having the hierarchy of the virtualization infrastructure. Affiliation relationships between the parent and child members of the virtualization infrastructure are established (e.g., follower/followee relationships or friend relationships).

At procedure 540, affiliation relationships between parent members and child members of the virtualization infrastructure are established. The affiliation relationships allow for child members to access shared message streams corresponding to the parent members.

With reference to FIG. 5B, in one embodiment, flow diagram 500 proceeds to procedure 550. At procedure 550, responsive to identifying a change in the virtualization infrastructure, the social network is automatically updated to reflect the change. In various embodiments, the change in the virtualization infrastructure is the removal of a member, the addition of a member, or the movement of a child member from a first parent member to a second parent member. Where the change is the movement of a child member from a first parent member to a second parent member, as shown at procedure 552, an existing affiliation relationship between the child member and the first parent member is cancelled. At procedure 554, a new affiliation relationship between the child member and the second parent member is established.

With reference to FIG. 5C, in one embodiment, flow diagram 500 proceeds to procedure 570. At procedure 570, the identified members are automatically added to the social network. For example, an identified member is created in the social network using the MAC address of the associated members as the username and email. In another embodiment, the UUID for a VM is used as the member's username and email. The social network can provide the member with its permanent access information, e.g., Socialcast® ID, over the social network using the initial login information.

Figure 6A:
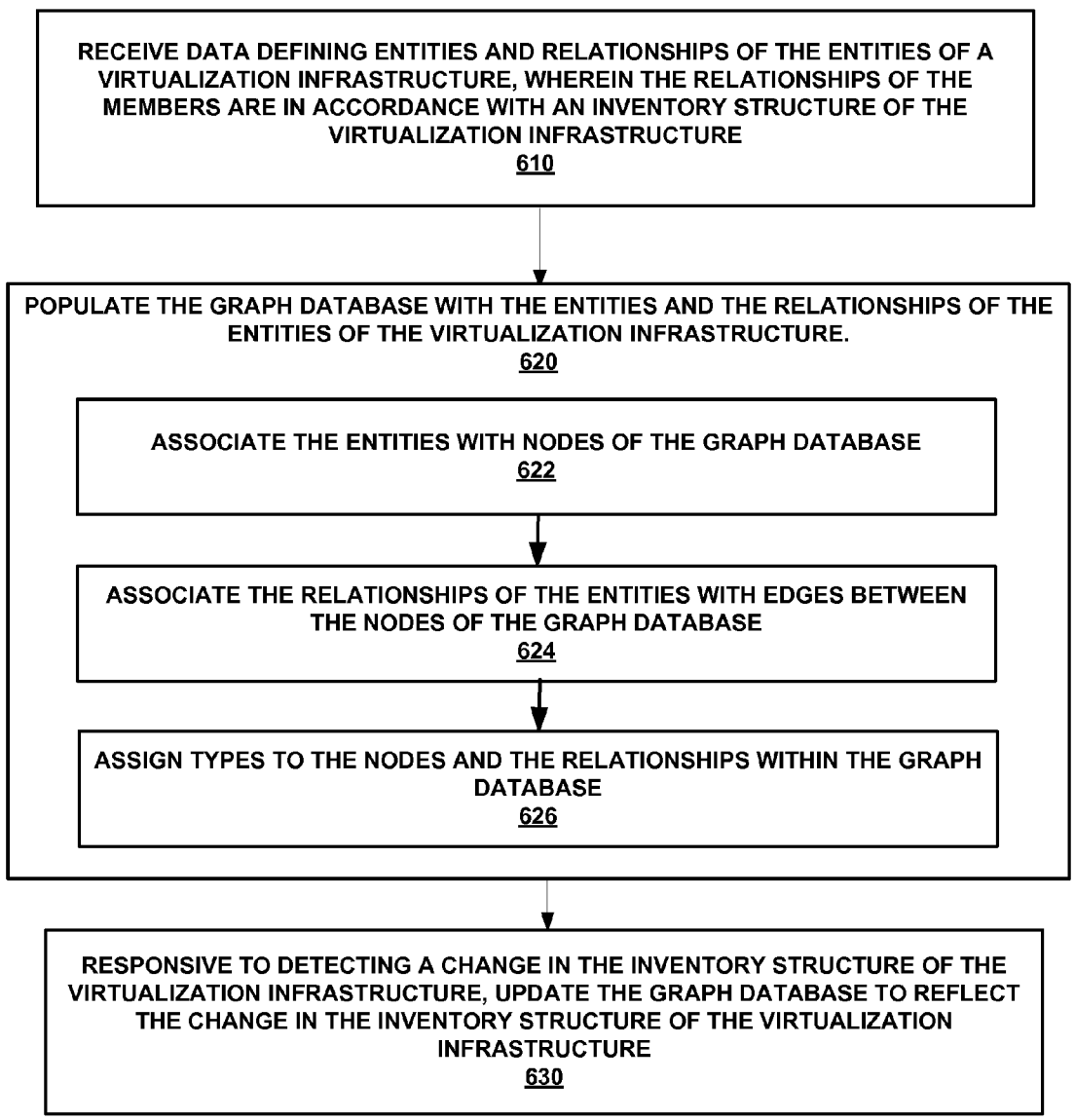
FIG. 6A is a flow diagram of example operations of a method for creating a graph database of a virtualization infrastructure, according to various embodiments of the present invention

FIG. 6A is a flow diagram 600 of a method for creating a graph database of a virtualization infrastructure, according to various embodiments of the present invention. Although specific procedures are disclosed in flow diagram 600, embodiments are well suited to performing various other procedures or variations of the procedures recited in flow diagram 600. It is appreciated that the procedures in flow diagram 600 may be performed in an order different than presented, that not all of the procedures in flow diagram 600 may be performed, and that additional procedures to those illustrated and described may be performed. All of, or a portion of, the procedures described by flow diagram 600 can be implemented by a processor or computer system executing instructions which reside, for example, on computer-usable/readable media.

With reference to FIG. 6A, at procedure 610 of flow diagram 600, data is received that defines entities and relationships of the entities of a virtualization infrastructure, wherein the relationships of the members are in accordance with an inventory structure of the virtualization infrastructure. In one embodiment the entities of the virtualization infrastructure include: a system administrator, a virtualization management server, a plurality of hosts, a plurality of virtual machines, and a datacenter. In one embodiment, the datacenter represents a group of hosts of the plurality of hosts, as well as clusters, datastores, networks, and other entities of a virtualization infrastructure.

At procedure 620, the graph database is populated with the entities and the relationships of the entities of the virtualization infrastructure. In one embodiment, the entities correspond to members of a social network of the virtualization infrastructure and the relationships of entities correspond to relationships of the members of the social network.

In one embodiment, as shown at procedure 622, the entities of the virtualization infrastructure are associated with nodes of the graph database. In one embodiment, as shown at procedure 624, the relationships of the entities are associated with edges between the nodes of the graph database. In one embodiment, as shown at procedure 626, types are assigned to the nodes and the relationships within the graph database.

In one embodiment, as shown at procedure 630, responsive to detecting a change in the inventory structure of the virtualization infrastructure, the graph database is updated to reflect the change in the inventory structure of the virtualization infrastructure. In one embodiment, the virtualization infrastructure notifies the graph database of the change by updating the entity and relationship information populating the graph database to reflect the change. In another embodiment, the graph database periodically scans the virtualization infrastructure for changes in the inventory structure of the virtualization infrastructure and updates the member and relationship information populating the graph database to reflect the change.

Figure 6B:
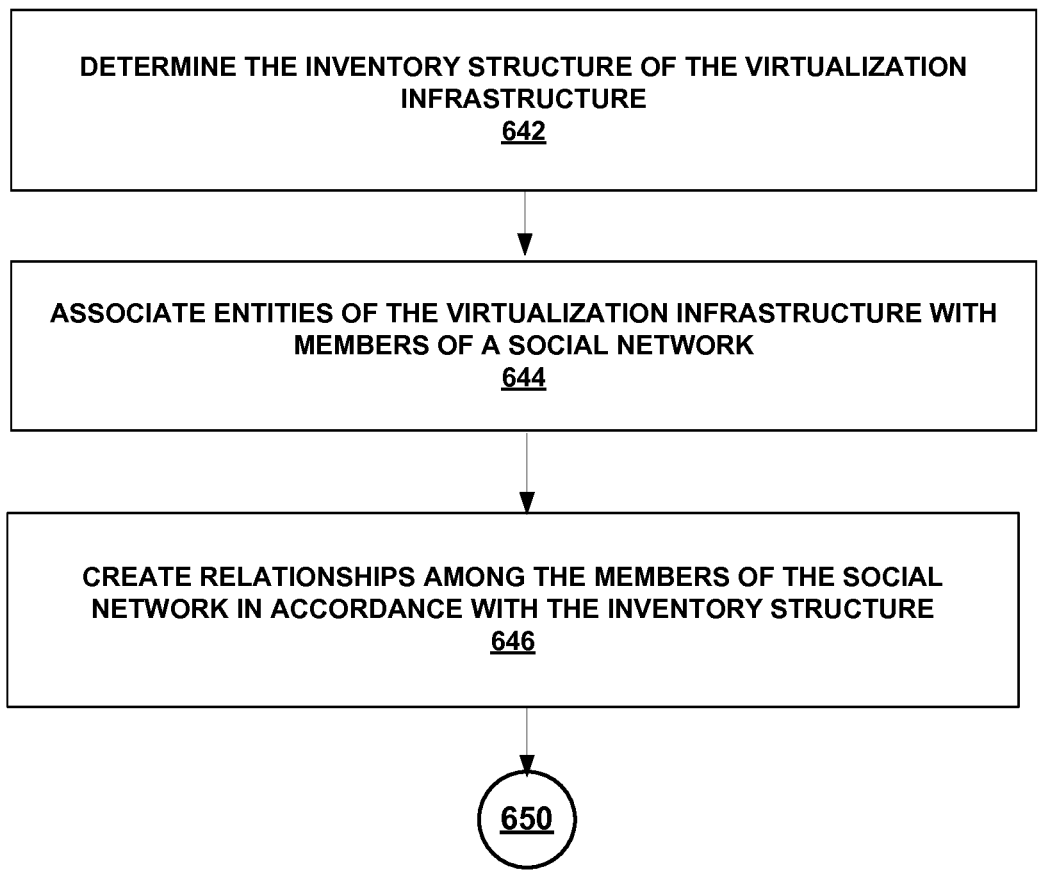
FIGS. 6B and 6C are a flow diagram of example operations of a method for creating a graph database based on a social network of members of a virtualization infrastructure, according to various embodiments of the present invention.
Figure 6C:
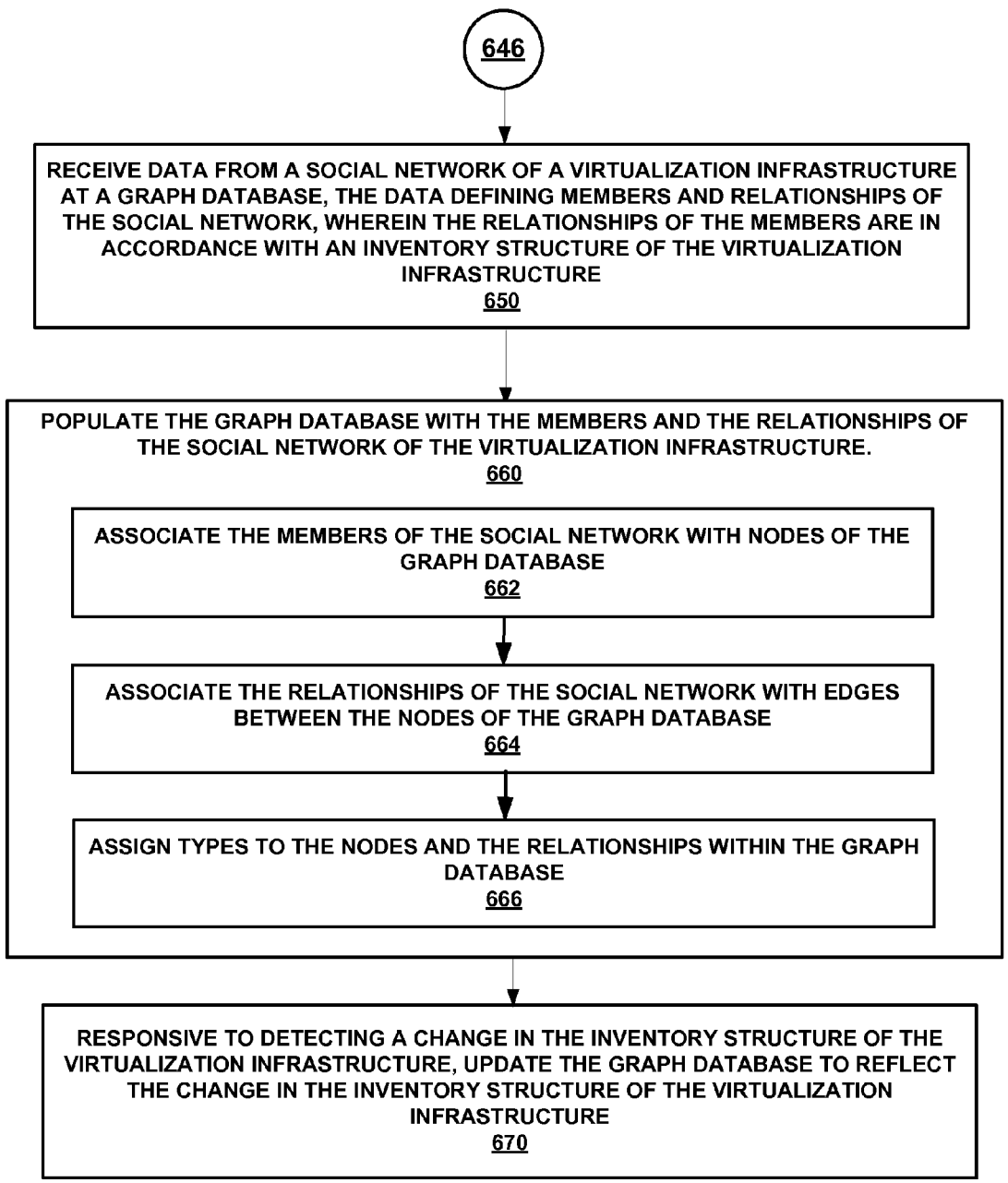

FIGS. 6B and 6C are flow diagram 640 of a method for creating a graph database based on a social network of members of a virtualization infrastructure, according to various embodiments of the present invention. Although specific procedures are disclosed in flow diagram 640, embodiments are well suited to performing various other procedures or variations of the procedures recited in flow diagram 640. It is appreciated that the procedures in flow diagram 640 may be performed in an order different than presented, that not all of the procedures in flow diagram 640 may be performed, and that additional procedures to those illustrated and described may be performed. All of, or a portion of, the procedures described by flow diagram 640 can be implemented by a processor or computer system executing instructions which reside, for example, on computer-usable/readable media.

With reference to FIG. 6B, in one embodiment, at procedure 642 of flow diagram 640, the inventory structure of the virtualization infrastructure is determined. For example, with reference to FIG. 1, in one embodiment, virtualization management server 110 starts at any entity of virtualization infrastructure 100 and locates all children of that entity. In one embodiment, the active members of the virtualization infrastructure are identified. For purposes of the instant specification, this operation is also referred to as mapping the virtualization infrastructure.

In one embodiment, at procedure 644, entities of the virtualization infrastructure are associated with members of a social network. At procedure 646, relationships among the members of the social network are created in accordance with the inventory structure.

It should be appreciated that procedures 642, 644 and 646 need not be performed explicitly for the creation of the graph database. In contrast, an existing social network of the virtualization infrastructure may be leveraged to create the graph database. Moreover, it should be appreciated that any method or process for creating a social network of a virtualization infrastructure may be used. For example, flow diagram 500 of FIGS. 5A-5C may be used to create the social network of the virtualization infrastructure.

With reference to FIG. 6C, at procedure 650 of flow diagram 640, data is received from a social network of a virtualization infrastructure at a graph database. The data defines members and relationships of the social network, wherein the relationships of the members are in accordance with an inventory structure of the virtualization infrastructure. In one embodiment the entities of the virtualization infrastructure include: a system administrator, a virtualization management server, a plurality of hosts, and a plurality of virtual machines. In one embodiment, the entities of the virtualization infrastructure further include a datacenter, wherein the datacenter represents a group of hosts of the plurality of hosts, as well as clusters, datastores, networks, and other entities of a virtualization infrastructure.

At procedure 660, the graph database is populated with the members and the relationships of the social network of the virtualization infrastructure. In one embodiment, the members include users corresponding to entities of the virtualization infrastructure and groups of users.

In one embodiment, as shown at procedure 662, the members of the social network are associated with nodes of the graph database. In one embodiment, as shown at procedure 664, the relationships of the social network are associated with edges between the nodes of the graph database. In one embodiment, as shown at procedure 666, types are assigned to the nodes and the relationships within the graph database.

In one embodiment, as shown at procedure 670, responsive to detecting a change in the inventory structure of the virtualization infrastructure, the graph database is updated to reflect the change in the inventory structure of the virtualization infrastructure. In one embodiment, the social network notifies the graph database of the change by updating the member and relationship information populating the graph database to reflect the change. In another embodiment, the graph database periodically scans the social network for changes in the inventory structure of the virtualization infrastructure and updates the member and relationship information populating the graph database to reflect the change. For example, responsive to identifying a change in the virtualization infrastructure, the social network is automatically updated to reflect the change. When the change is made in the social network, the social network may communicate the update to the graph database, ensuring that the graph database is current. In another embodiment, the virtual infrastructure itself can send updates to the graph database.

Figure 7:
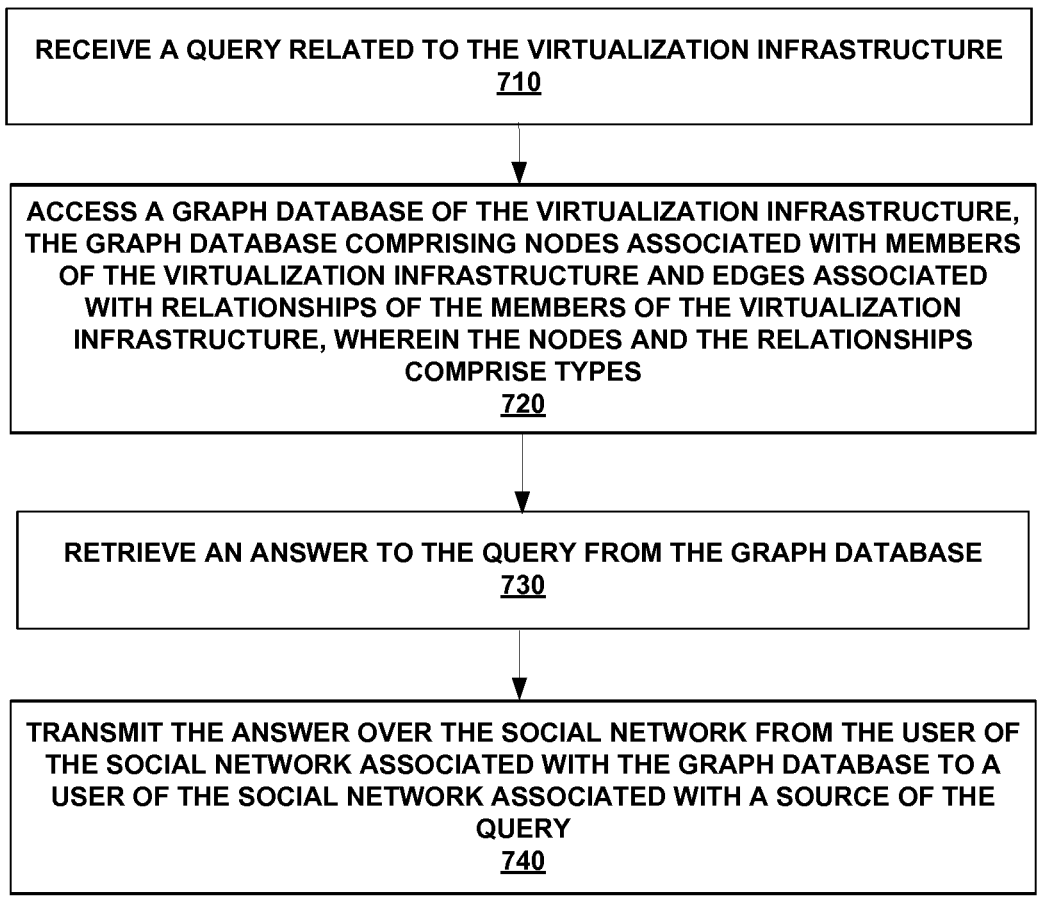
FIG. 7 is a flow diagram of example operations of a method for using a graph database of a virtualization infrastructure, according to various embodiments of the present invention.

FIG. 7 is a flow diagram 700 of a method for using a graph database of a virtualization infrastructure, according to various embodiments of the present invention. Although specific procedures are disclosed in flow diagram 700, embodiments are well suited to performing various other procedures or variations of the procedures recited in flow diagram 700. It is appreciated that the procedures in flow diagram 700 may be performed in an order different than presented, that not all of the procedures in flow diagram 700 may be performed, and that additional procedures to those illustrated and described may be performed. All of, or a portion of, the procedures described by flow diagram 700 can be implemented by a processor or computer system executing instructions which reside, for example, on computer-usable/readable media.

At procedure 710 of flow diagram 700, a query related to the virtualization infrastructure is received. In one embodiment, the query identifies at least one of a type of member of the virtualization infrastructure and a type of relationship of the virtualization infrastructure.

In one embodiment, the query is received at a virtualization infrastructure manager. In another embodiment, the query is sent through a social network of the virtualization infrastructure, wherein the query is received at a user of the social network associated with the graph database. In one embodiment, the query is communicated via a private message to the user of the social network associated with the graph database.

At procedure 720, a graph database of the virtualization infrastructure is accessed. The graph database includes nodes associated with members of the virtualization infrastructure and edges associated with relationships of the members of the virtualization infrastructure. Moreover, the nodes and the relationships include types.

In one embodiment, the graph database is based on a social network of the virtualization infrastructure. In one embodiment, the members of the social network include users corresponding to entities of the virtualization infrastructure and groups of users, and wherein the relationships of the members are in accordance with an inventory structure of the virtualization infrastructure.

At procedure 730, an answer to the query is retrieved from the graph database.

In one embodiment, at procedure 740, the answer is transmitted over the social network from the user of the social network associated with the graph database to a user of the social network associated with a source of the query. In one embodiment, the answer is communicated via a private message to the user of the social network associated with the source of the query.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What is claimed is:

1. A computer-implemented method for creating a graph database of a virtualization infrastructure, the method comprising:

receiving data defining entities and relationships of the entities of a virtualization infrastructure at the graph database, wherein the relationships of the entities are in accordance with an inventory structure of the virtualization infrastructure;

creating a social network of identified members of the virtualization infrastructure based on the relationships of the entities of the virtualization infrastructure, wherein the virtualization infrastructure is mapped into the social network comprising human members and non-human members, wherein the non-human members of the social network comprise components of the virtualization infrastructure, and wherein the components of the virtualization infrastructure comprise a host computing system and a virtual machine hosted by the host computing system, wherein the relationships of the entities correspond to relationships of the social network, and wherein the relationships of the social network correspond to a communication connection between members of the social network;

establishing affiliation relationships within the social network between identified members of the virtualization infrastructure based on the relationships of the entities;

populating the graph database with the entities and the relationships of the entities of the virtualization infrastructure, the graph database comprising nodes associated with the members of the virtualization infrastructure and edges associated with the relationships of the members of the virtualization infrastructure, wherein the relationships of the members are in accordance with the inventory structure of the virtualization infrastructure, and wherein the nodes and the relationships within the graph database comprise types, wherein the graph database is configured to receive a query to the graph database and to transmit an answer to the query over the social network; and responsive to detecting a change in the inventory structure of the virtualization infrastructure, updating the graph database to reflect the change in the inventory structure of the virtualization infrastructure.

2. The computer-implemented method of claim 1, wherein the populating the graph database comprises: associating the entities with nodes of the graph database; and associating the relationships of the entities with edges between the nodes of the graph database.

3. The computer-implemented method of claim 2 wherein the populating the graph database further comprises: assigning types to the nodes and the relationships within the graph database.

4. The computer-implemented method of claim 1, wherein the entities of the virtualization infrastructure comprise: a system administrator; a virtualization management server; a plurality of hosts; a plurality of virtual machines; and a datacenter.

5. A computer-implemented method for creating a graph database of a virtualization infrastructure, the method comprising:

receiving data from a social network of a virtualization infrastructure at the graph database, wherein the social network is of identified members of the virtualization infrastructure based on relationships of entities of the virtualization infrastructure, the social network comprising affiliation relationships between the identified members of the virtualization infrastructure based on the relationships of the identified members, the wherein the virtualization infrastructure is mapped into the social network comprising human members and non-human members, wherein the non-human members of the social network comprise components of the virtualization infrastructure, and wherein the components of the virtualization infrastructure comprise a host computing system, a virtual machine hosted by the host computing system, the data defining members and relationships of the social network, wherein the members of the social network correspond to entities of the virtualization infrastructure and the relationships of the members of the social network correspond to relationships of the entities of the virtualization infrastructure and wherein the relationships of the members are in accordance with an inventory structure of the virtualization infrastructure, and wherein the relationships of the social network correspond to a communication connection between members of the social network;

populating the graph database with the members and the relationships of the social network of the virtualization infrastructure, the graph database comprising nodes associated with the members of the virtualization infrastructure and edges associated with the relationships of the members of the virtualization infrastructure, and wherein the nodes and the relationships within the graph database comprise types, wherein the graph database is configured to receive a query to the graph database and to transmit an answer to the query over the social network; and responsive to detecting a change in the inventory structure of the virtualization infrastructure, updating the graph database to reflect the change in the inventory structure of the virtualization infrastructure.

6. The computer-implemented method of claim 5, wherein the populating the graph database comprises: associating the members of the social network with nodes of the graph database; and associating the relationships of the social network with edges between the nodes of the graph database.

7. The computer-implemented method of claim 6 wherein the populating the graph database further comprises: assigning types to the nodes and the relationships within the graph database.

8. The computer-implemented method of claim 5, wherein the members comprise users corresponding to the entities of the virtualization infrastructure and groups of users.

9. The computer-implemented method of claim 8, wherein the entities of the virtualization infrastructure comprise: a system administrator; a virtualization management server; a plurality of hosts; and a plurality of virtual machines.

10. The computer-implemented method of claim 9, wherein the entities of the virtualization infrastructure further comprise: a datacenter, wherein the datacenter represents a group of hosts of the plurality of hosts.

11. The computer-implemented method of claim 5, further comprising: determining the inventory structure of the virtualization infrastructure; associating entities of the virtualization infrastructure with the members of the social network; and creating the relationships of the social network among the members of the social network in accordance with the inventory structure.

12. A non-transitory computer readable storage medium having computer-readable program code stored thereon for causing a computer system to perform a method for creating a graph database of a virtualization infrastructure, the method comprising:
determining an inventory structure of the virtualization infrastructure, wherein components of the virtualization infrastructure comprise a host computing system and a virtual machine hosted by the host computing system;
creating a social network of identified members of the virtualization infrastructure based on relationships of entities of the virtualization infrastructure the members of the virtualization infrastructure comprising human members and non-human members, wherein the non-human members of the social network comprise the components of the virtualization infrastructure;
creating relationships among the members of the social network in accordance with the inventory structure, wherein the relationships of the social network correspond to a communication connection between members of the social network, the social network comprising affiliation relationships between the identified members of the virtualization infrastructure based on the relationships of the identified members;
retrieving data defining the members and the relationships from the social network at the graph database;
populating the graph database with the members and the relationships of the social network of the virtualization infrastructure, the graph database comprising nodes associated with the members of the virtualization infrastructure and edges associated with the relationships of the members of the virtualization infrastructure, wherein the relationships of the members are in accordance with the inventory structure of the virtualization infrastructure, and wherein the nodes and the relationships within the graph database comprise types, wherein the graph database is configured to receive a query to the graph database and to transmit an answer to the query over the social network; and
responsive to detecting a change in the inventory structure of the virtualization infrastructure, updating the graph database to reflect the change in the inventory structure of the virtualization infrastructure.

13. The non-transitory computer readable storage medium of claim 12, wherein the populating the graph database comprises: associating the members of the social network with nodes of the graph database; and associating the relationships of the social network with edges between the nodes of the graph database.

14. The non-transitory computer readable storage medium of claim 13 wherein the populating the graph database further comprises: assigning types to the nodes and the relationships within the graph database.

15. The non-transitory computer readable storage medium of claim 12, wherein the members comprise users and groups of users.

16. The non-transitory computer readable storage medium of claim 12, wherein the entities of the virtualization infrastructure comprise: a system administrator; a virtualization management server; a plurality of hosts; and a plurality of virtual machines.

17. The non-transitory computer readable storage medium of claim 16, wherein the entities of the virtualization infrastructure further comprises: a datacenter, wherein the datacenter represents a group of hosts of the plurality of hosts.

18. A computer-implemented method for creating a graph database of a virtualization infrastructure, the method comprising:
receiving data defining entities and relationships of the entities of the virtualization infrastructure at the graph database;
creating a social network of identified members of the virtualization infrastructure based on relationships of entities of the virtualization infrastructure, wherein the virtualization infrastructure is mapped into the social network comprising human members and non-human members, wherein the non-human members of the social network comprise components of the virtualization infrastructure, and wherein the components of the virtualization infrastructure comprise a host computing system, a virtual machine hosted by the host computing system, the data defining members and relationships of the social network, wherein the members comprise users corresponding to entities of the virtualization infrastructure and groups of users, and wherein the relationships of the members of the social network correspond to relationships of the entities of the virtualization infrastructure, the social network comprising affiliation relationships between the identified members of the virtualization infrastructure based on the relationships of the identified members, and wherein the relationships of the members are in accordance with an inventory structure of the virtualization infrastructure, and wherein the affiliation relationships of the social network correspond to a communication connection between members of the social network;
populating the graph database with the members and the relationships of the social network of the virtualization infrastructure, wherein the graph database is configured to receive a query to the graph database and to transmit an answer to the query over the social network;
linking the members of the social network with the nodes of the graph database;
linking the relationships of the social network with edges between the nodes of the graph database;
assigning types to the nodes and the relationships within the graph database; and responsive to detecting a change in the inventory structure of the virtualization infrastructure, updating the graph database to reflect the change in the inventory structure of the virtualization infrastructure.

19. The computer-implemented method of claim 18, wherein the entities of the virtualization infrastructure comprise: a system administrator; a virtualization management server; a plurality of hosts; and a plurality of virtual machines.

20. The computer-implemented method of claim 19, wherein the entities of the virtualization infrastructure further comprise: a datacenter, wherein the datacenter represents a group of hosts of the plurality of hosts.

21. The computer-implemented method of claim 18, further comprising: determining the inventory structure of the virtualization infrastructure; associating the entities of the virtualization infrastructure with members of a social network; and creating relationships among the members of the social network in accordance with the inventory structure.

22. A computer-implemented method for creating a graph database of a virtualization infrastructure, the method comprising:
- at a virtualization infrastructure manager, identifying at least a portion of members of the virtualization infrastructure, wherein the members of the virtualization infrastructure comprise a host computing system and a virtual machine hosted by the host computing system;
- identifying parent/child relationships of identified members of the virtualization infrastructure, wherein the parent/child relationships of identified members of the virtualization infrastructure correspond to a communication connection between members of a social network and are in accordance with an inventory structure of the virtualization infrastructure;
- generating a social network of the identified members of the virtualization infrastructure based on the parent/child relationships, wherein the virtualization infrastructure is mapped into a social network comprising human members and non-human members, wherein the non-human members of the social network comprise components of the virtualization infrastructure, and wherein the parent/child relationships of the members are in accordance with the inventory structure of the virtualization infrastructure;
- populating the graph database with the members and the relationships of the social network of the virtualization infrastructure, the graph database comprising nodes associated with members of the virtualization infrastructure and edges associated with the relationships of the members of the virtualization infrastructure, and wherein the graph database is configured to receive a query to the graph database and to transmit an answer to the query over the social network;
- retrieving data defining the identified members and the parent/child relationships from the social network at the graph database;
- linking the identified members of the social network with the nodes of the graph database;
- assigning types to the nodes and the parent/child relationships within the graph database; and
- responsive to detecting a change in the inventory structure of the virtualization infrastructure, updating the graph database to reflect the change in the inventory structure of the virtualization infrastructure.

\* \* \* \* \*